US008382141B2

(12) United States Patent
Schuettenberg

(10) Patent No.: US 8,382,141 B2
(45) Date of Patent: Feb. 26, 2013

(54) AXLE SECURITY FIXTURE

(75) Inventor: Donald W. Schuettenberg, Antioch, IL (US)

(73) Assignee: ATC Transportation, LLC, Pleasant Prairie, WI (US)

( * ) Notice: Subject to any disclaimer, the term of this patent is extended or adjusted under 35 U.S.C. 154(b) by 313 days.

(21) Appl. No.: 12/654,904

(22) Filed: Jan. 8, 2010

(65) Prior Publication Data
US 2010/0171286 A1 Jul. 8, 2010

Related U.S. Application Data

(60) Provisional application No. 61/193,920, filed on Jan. 8, 2009.

(51) Int. Cl.
*B60D 1/14* (2006.01)
*B62D 53/04* (2006.01)

(52) U.S. Cl. ........................ 280/402; 280/503; 280/476.1

(58) Field of Classification Search ................. 280/402, 280/476.1, 503; 414/563
See application file for complete search history.

(56) References Cited

U.S. PATENT DOCUMENTS

| 2,411,411 | A | * | 11/1946 | Blair et al. ............... 280/402 |
| 2,416,921 | A | * | 3/1947 | Hingley .................. 280/402 |
| 2,436,485 | A | * | 2/1948 | Roxy ..................... 280/402 |
| 2,436,499 | A | * | 2/1948 | Williams ................. 280/402 |
| 2,647,760 | A | * | 8/1953 | Mettetal, Jr. ............. 280/402 |
| 4,822,089 | A | | 4/1989 | Moore et al. |
| 5,391,044 | A | | 2/1995 | Young |
| 7,100,933 | B2 | | 9/2006 | Zackovich et al. |
| 7,789,411 | B2 | | 9/2010 | Schuettenberg |
| 7,980,582 | B2 | | 7/2011 | Schuettenberg |

* cited by examiner

*Primary Examiner* — Tony Winner
(74) *Attorney, Agent, or Firm* — Vorys, Saler, Seymour & Pease LLP

(57) ABSTRACT

An axle security fixture comprises one or more bracket portions configured to be secured about a rail of a truck frame, a receiving portion contiguous with the bracket portions for receiving a plurality of axles, and a cover situated atop the axles and secured to the receiving portion.

8 Claims, 3 Drawing Sheets

AXLE SECURITY FIXTURE

RELATED APPLICATION

This application is a non-provisional application based upon Provisional Application Ser. No. 61/193,920, filed Jan. 8, 2009, priority to which is hereby claimed and which is incorporated herein by reference.

FIELD OF THE INVENTION

This invention generally relates to apparatuses and methods for transportation of multiple vehicles in piggy back or tandem configuration from one location to another. The invention may also be used in the field of towing vehicles generally.

BACKGROUND OF THE INVENTION

The economy of the United States, if not of the world, depends to a great extent on fleets of large trucks for the distribution of goods, such as foods, consumer products, durable goods, and even industrial equipment. There are many manufacturers of such trucks, which concern primarily, but are not limited to, class 7 or class 8 over-the-road trucks. Once these trucks are manufactured, they require shipment or transportation to an individual customer or company for whom the truck was made, or to a dealer who sells or leases these trucks. The most obvious method to transport these trucks is by driving them directly to their destination. This method has disadvantages, at least because each truck requires a driver, who must be paid for his or her services and for whom return transportation must be arranged.

In order to overcome the necessity of a driver for delivering each truck, a variety of techniques have been devised to use a first truck that will carry or tow one or more additional trucks to the desired destination. Examples of these devices can be found, by way of illustration, in U.S. Pat. Nos. 4,555,214, and 4,949,985.

Common to the use of devices such as those described in the foregoing patents is the need to remove and store for transport the left and right axles of the rear wheels of the truck being towed. This is because those axles are connected to the drive train of the towed vehicle and, unless they are removed, the drive train of the towed vehicle will engage during transport, leading to mechanical damage to the towed vehicle.

Typically, these axles from the towed vehicle have been stored in haphazard fashion in either the towed vehicle or the towing vehicle. For example, one method has been to lock the left and right rear axles in the cab of the towed vehicle. Although this method provides for security of the axles, often the axles are left to roll around in the cab of the towed vehicle, subjecting the axles and/or the cab to damage. As the cab is part of a new vehicle to be delivered, damage to the cab is particularly disadvantageous.

Another method of stowing the axles has been to secure them across the truck frames of the towed vehicle. Typically this is done by wrapping the axles in plastic to protect them from the elements, and then using U-bolts, nuts and steel plates to secure the axles to the towed truck frame rails. A related method is to secure the removed axles to the towed truck frame rails by wrapping banding around the axles and the rails. While these methods have the advantage of simplicity, the U-bolts or wrapping can easily be undone by a would-be thief, leading to loss of the axles. In addition, the wrapping or U-bolts can come loose during transport, possibly leading to product damage, accident and/or injury to other motorists.

What is needed is an apparatus and method for securing the axles of a towed vehicle. The invention disclosed herein provides such an improved apparatus and method. These and other advantages of the invention, as well as additional inventive features, will be apparent from the description of the invention provided herein.

BRIEF SUMMARY OF THE INVENTION

One aspect is an apparatus for securing axles. The apparatus comprises a fixture having a first portion suitable for securing about a top of the truck rail, and a second portion suitable for receiving one or more axles. A cover is then placed on top of the axles and secured to the fixture.

Another aspect is a method for securing axles. The method comprises first, providing on each side of the towing vehicle a fixture having a first portion suitable for securing about a top of the truck rail, and a second portion suitable for receiving one or more axles. Next, one or more axles are placed in the fixtures. Finally, a cover is placed on top of the axles and secured to the fixture.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS

Figure 1:
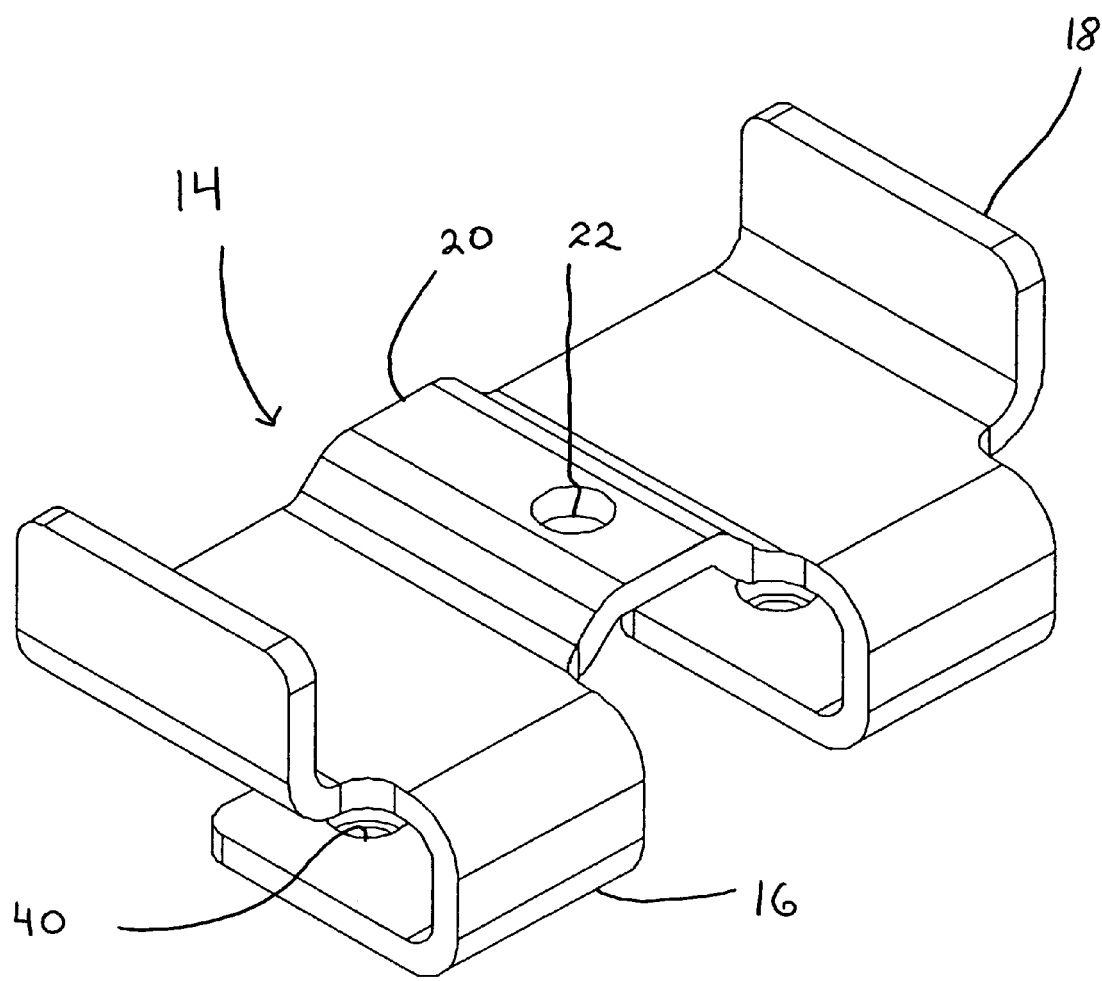
FIG. 1 is a perspective view of one embodiment of an axle security fixture.
Figure 2:
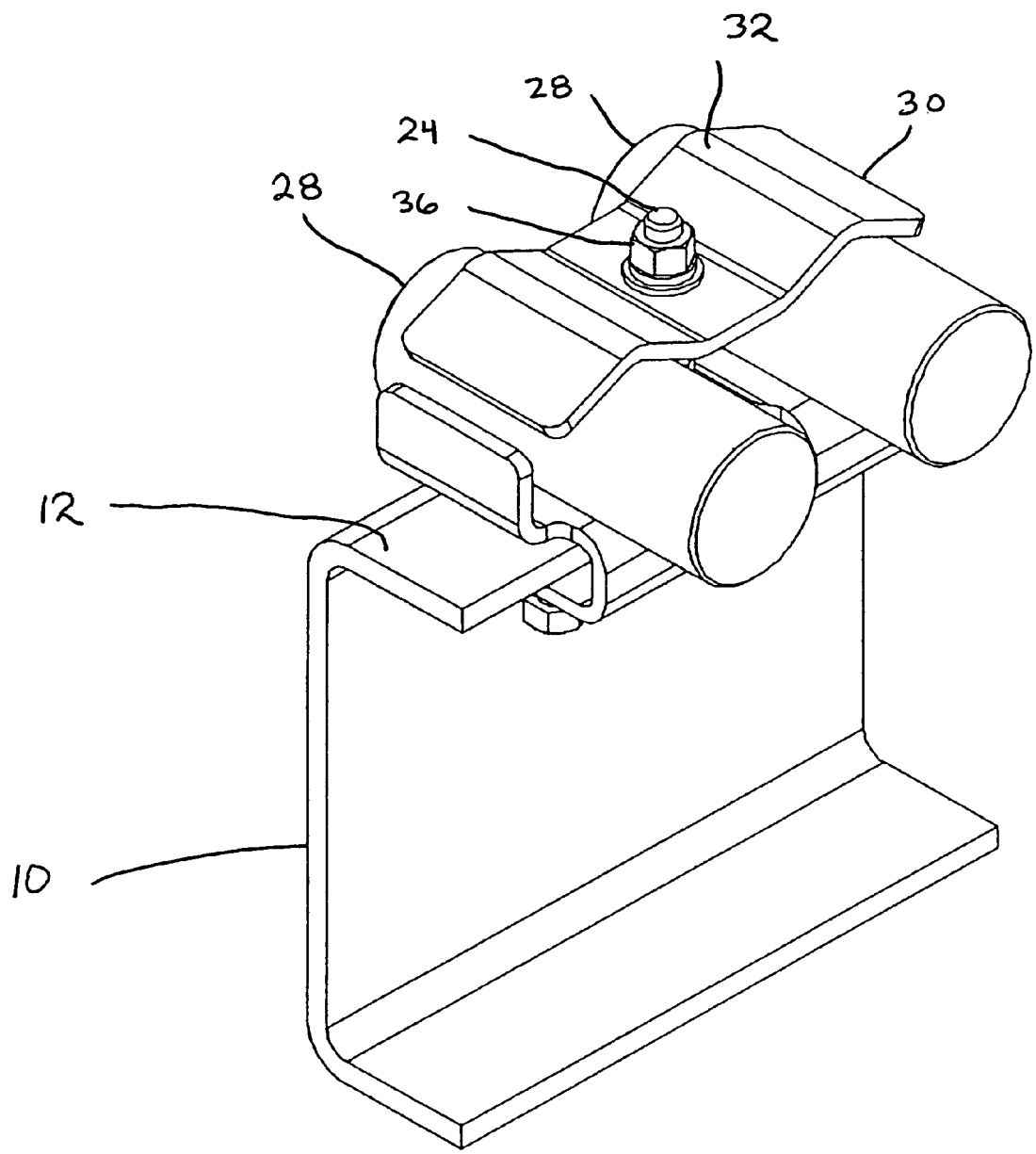
FIG. 2 is the view of the embodiment of an axle security fixture of FIG. 1 with axles situated in the fixture and a cover placed atop the axles.
Figure 3:
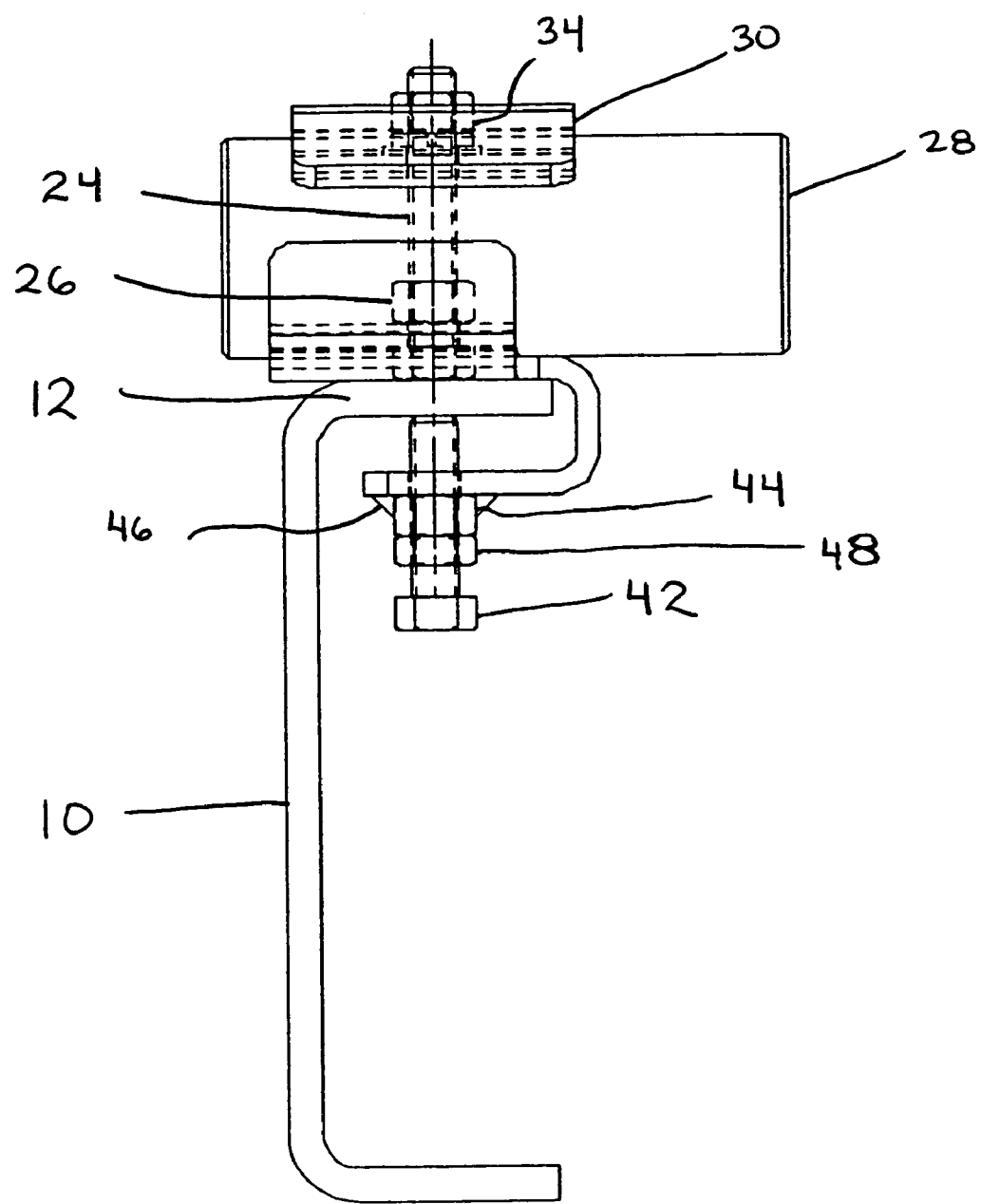
FIG. 3 is a side view of the embodiment of an axle security fixture of FIG. 1.

A preferred embodiment of an axle security fixture is shown in FIGS. 1-3. Security fixture 14 comprises one or more bracket portions 16, each of which is configured to fit around a top rail 12 of frame 10. The bottom side of each bracket portion 16 has a hole 40, each accommodating a threaded bolt 42 and nut 44. Preferably, nut 44 is welded to bracket portion 16 as indicated by welds 46. An additional security nut 48 may also preferably be provided below nut 44. As threaded bolts 42 are tightened, bracket portion 16 is secured to rail 12.

Security fixture 14 also comprises a receiving portion 18, which is preferably contiguous with and unitary with bracket portions 16. In an alternative embodiment, receiving portion 18 could be a separate member affixed such as by welding to bracket portions 16. Receiving portion 18 includes a tented region 20 with a hole 22 therein to accommodate a bolt 24 which extends upward and is affixed by a nut 26 atop tented region 20. The tented region 20 also serves to demarcate the two areas of the receiving portion in each of which an axle 28 will be received.

A cover 30 is placed atop the axles 28. Cover 30 has two tented portions 32 sized for accommodating the tops of axles 28 and for forcing the axles downward against receiving portion 18. Cover 30 also includes a hole 34 for accommodating bolt 24. A nut 36 is tightened against cover 30 around bolt 24 to tighten the cover on the axles.

In the currently preferred embodiment, the axle security fixture, including the bracket portion, receiving portion and cover are made from steel. However, other materials such as aluminum, plastics and composites may prove to be suitable as well, and the construction of the fixture from such materials would not depart from the spirit of the invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An axle security fixture comprising:
    a unitary main member, said main member comprising:
        a plurality of longitudinally spaced bracket portions configured to be secured about a rail of a truck frame;
        a plurality of receiving portions for receiving a plurality of axles, each said receiving portion situated above and contiguous with one of said bracket portions; and
        one or more tented regions longitudinally joining said receiving portions; and
    a cover configured to be situated atop said axles and secured to at least one of said tented regions.

2. The fixture of claim 1, wherein said cover includes at least one tented region.

3. The fixture of claim 1, wherein said bracket portions are secured to said rail by one or more bolts.

4. The fixture of claim 1, wherein said cover is secured to said receiving portion by a bolt.

5. A method of securing a plurality of axles to a truck frame, comprising:
    providing an axle security fixture comprising:
        a unitary main member, said main member comprising:
            a plurality of longitudinally spaced bracket portions configured to be secured about a rail of a truck frame;
            a plurality of receiving portions for receiving a plurality of axles, each said receiving portion situated above and contiguous with one of said bracket portions; and
            one or more tented regions longitudinally joining said receiving portions; and
        a cover configured to be situated atop said axles and secured to at least one of said tented regions;
    securing said bracket portions to said rail;
    placing an axle in each of said receiving portions; and
    securing said cover to said at least one tented region.

6. The method of claim 5, wherein said cover includes at least one tented region.

7. The method of claim 5, wherein said bracket portions are secured to said rail by one or more bolts.

8. The method of claim 5, wherein said cover is secured to said receiving portion by a bolt.

* * * * *